(12) United States Patent
Ekström et al.

(10) Patent No.: US 11,788,659 B2
(45) Date of Patent: Oct. 17, 2023

(54) LOCKING MECHANISM FOR QUICK CONNECT COUPLING

(71) Applicant: CEJN AB, Skövde (SE)

(72) Inventors: Jörgen Ekström, Skövde (SE); Anna-Lena Olsson, Skövde (SE)

(73) Assignee: CEJN AB, Skövde (SE)

( * ) Notice: Subject to any disclaimer, the term of this patent is extended or adjusted under 35 U.S.C. 154(b) by 568 days.

(21) Appl. No.: 17/050,884

(22) PCT Filed: Apr. 30, 2018

(86) PCT No.: PCT/EP2018/061031
§ 371 (c)(1),
(2) Date: Oct. 27, 2020

(87) PCT Pub. No.: WO2019/210933
PCT Pub. Date: Nov. 7, 2019

(65) Prior Publication Data
US 2021/0231244 A1    Jul. 29, 2021

(51) Int. Cl.
*F16L 37/23*  (2006.01)
*F16L 37/34*  (2006.01)

(52) U.S. Cl.
CPC ............. *F16L 37/23* (2013.01); *F16L 37/34* (2013.01)

(58) Field of Classification Search
CPC ............ F16L 37/23; F16L 37/22; F16L 37/34
(Continued)

(56) References Cited

U.S. PATENT DOCUMENTS

| 3,097,867 A | 7/1963 | Saloum |
| 3,140,072 A * | 7/1964 | Scinto, Jr. ............... F16L 37/23 74/41 |

(Continued)

FOREIGN PATENT DOCUMENTS

| CN | 202302469 U | 7/2012 |
| EP | 1647757 A1 | 4/2006 |

(Continued)

OTHER PUBLICATIONS

Notification of Transmittal of the International Search Report and the Written Opinion of the International Searching Authority from corresponding PCT/EP2018/061031 dated Nov. 9, 2018.

*Primary Examiner* — David Bochna
(74) *Attorney, Agent, or Firm* — Lando & Anastasi, LLP (57) ABSTRACT

A locking mechanism for a quick connect coupling includes a locking sleeve that is axially displaceable for locking the quick connect coupling in a locked position and for unlocking the quick connect coupling in an unlocked position. The locking mechanism comprises a safety ring, the safety ring is axially displaceable for engaging the locking sleeve and the safety ring being partly inside or partly outside the locking sleeve. The safety ring being positionable in three different axial positions, a first axial position for allowing the locking sleeve to be in the unlocked position, a second axial position for allowing the safety ring to rotate, and a third axial position for allowing the locking sleeve to be in the locked position. The locking mechanism comprises a spring, the spring acting between the locking sleeve and the safety ring. The spring comprising a spring force forcing the locking sleeve and the safety ring away from each other. Methods using the locking mechanism are also provided.

12 Claims, 5 Drawing Sheets

(58) Field of Classification Search
USPC .................................... 285/276, 277, 86, 85
See application file for complete search history.

(56) References Cited

U.S. PATENT DOCUMENTS

| | | | | |
|---|---|---|---|---|
| 3,477,688 A | * | 11/1969 | Cruse | .................. F16L 37/23 251/149.9 |
| 4,685,490 A | | 8/1987 | Medvick et al. | |
| 5,056,560 A | | 10/1991 | DeMartelaere | |
| 2003/0042734 A1 | | 3/2003 | Kuwabara | |

FOREIGN PATENT DOCUMENTS

| | | |
|---|---|---|
| FR | 2372371 A1 | 6/1978 |
| GB | 1533080 A | 11/1978 |
| JP | H07103386 A | 4/1995 |
| JP | 2013210033 A | 10/2013 |

\* cited by examiner

LOCKING MECHANISM FOR QUICK CONNECT COUPLING

CROSS-REFERENCE TO RELATED APPLICATIONS

This application is a U.S. National Phase Application under 35 U.S.C. § 371 of International Application No. PCT/EP2018/061031, filed Apr. 30, 2018 which is hereby incorporated by reference in its entirety for all purposes.

TECHNICAL FIELD

The present disclosure relates to a locking mechanism and methods of using the same. More particularly, the locking mechanism is for a quick connect coupling having a locking sleeve. More particularly, the methods relate to locking or unlocking a male part to a female part of a quick connect coupling. The locking mechanism may be a safety feature of a quick connect coupling.

BACKGROUND

Some quick connect couplings have safety features to prevent a coupled male (nipple) and female part (coupling) to accidentally uncouple. Often the fluid flowing through the quick connect coupling has a high pressure and an accidental uncoupling may lead to serious accidents and injuries. Quick connect couplings with a locking sleeve that uncouples by an axial relative movement has a problem that a safety mechanism should be present to avoid accidental uncoupling.

While there is a large amount of quick connect couplings with safety features, there is still a need and desire to have a safety feature that is simple, but yet very safe. Such a safety feature must be simple in its construction, yet very reliable. Such a safety feature must not take much space, because the available space on and within a quick connect coupling is limited. Such a safety feature must fit new and existing couplings, and must be easily adaptable. Such a safety feature must be easy to operate and preferably its operation should be intuitive.

It is desirable to provide a safety feature for quick connect couplings that can overcome the above mentioned problems, but that is also inexpensive to manufacture, is easy to manufacture, and is robust. Such a safety feature must not only be safe, but must also appear to the user to be safe. The present disclosure is directed to overcoming one or more of the problems as set forth above.

SUMMARY OF THE INVENTION

It is an object of the present invention to provide a locking mechanism for a quick connect coupling having a locking sleeve, and methods of using the same. This object can be achieved by the features as defined by the independent claim. Further enhancements are characterised by the dependent claims.

According to one embodiment, a locking mechanism for a quick connect coupling having a locking sleeve (100) is disclosed. The locking sleeve is axially displaceable for locking the quick connect coupling in a locked position (110) and for unlocking the quick connect coupling in an unlocked position (120). The locking mechanism comprises a safety ring (200) and a spring (300). The safety ring (200) is axially displaceable for engaging the locking sleeve (100) and the safety ring (200) being partly inside or partly outside the locking sleeve (100). The safety ring being positionable in three different axial positions, a first axial position (210) for allowing the locking sleeve (100) to be in the unlocked position (120), a second axial position (220) for allowing the safety ring (200) to rotate, and a third axial position (230) for allowing the locking sleeve (100) to be in the locked position (110). The spring acting between the locking sleeve (100) and the safety ring (200), the spring (300) comprising a spring force forcing the locking sleeve (100) and the safety ring (200) away from each other.

According to one embodiment, the locking mechanism may further comprises a track (400) and a locking element (450), the locking element (450) being relatively movable in the track (400). The track (400) may be in the safety ring (200) or in a body (20) of the quick connect coupling, and the locking element (450) may be arranged on a body (20) of the quick connect coupling or arranged on the safety ring (200), respectively. The track (400) may comprise two grooves (401, 402) in the axial direction connected at each one of their ends with a third groove (400) in the circumferential direction. According to one embodiment, the first groove (401) in the axial direction may have a length (410) corresponding to the first axial position (210) for allowing the locking sleeve (100) to be in the unlocked position (120), the second groove (402) in the axial direction may have a first end point (430) corresponding to the third axial position (230), and the third groove (400) may have a second end point (420) corresponding to the second axial position (220) for allowing the safety ring (200) to rotate.

According to one embodiment, the safety ring may comprise an axial indentation (240) engaging and supporting the spring (300). Alternatively, or in addition, the safety ring may comprise an L-shaped flange (245) at one end supporting the spring (300).

According to one embodiment, the spring (300) may be arranged to provide a rotational spring force to the safety ring (200).

According to one embodiment, the locking mechanism may further comprise two, three, or four sets of the track (400) and the locking element (450). The sets may be 180 degrees, 120 degrees, or 90 degrees, respectively, positioned circumferentially, preferably equi-circumferentially, around the quick connect coupling.

According to one embodiment, a method of locking a male part to a female part of a quick connect coupling is disclosed. The method may use a female part of the quick connect coupling where the female part comprises a locking sleeve, a safety ring, and a spring with a spring force acting between the locking sleeve and safety ring. Alternatively, the method may use a locking mechanism according to any one of the embodiments disclosed herein. The method comprising the following steps in order: (A) moving the locking sleeve (100) and the safety ring (200) axially in a first axial direction (X) and inserting the male part into the female part; (B) moving the locking sleeve (100) axially in a second axial direction (Y) by the spring force of the spring (300); (C) moving the safety ring (200) in the second axial direction (Y) and rotating the safety ring (200); and (D) moving the safety ring (200) axially in the first axial direction (X) by the spring force locking the safety ring (200) against rotation and axial movement in the first axial direction (X).

According to one embodiment, the method may further comprise that in step (A), by moving the locking sleeve (100) and the safety ring (200) axially in the first axial direction (X) the safety ring (200) is moved to the first axial position (210); in step (C), by moving the safety ring (200) axially in the second direction (Y) the safety ring (200) is moved to the second axial position (220); and in step (D), by moving the safety ring (200) in the first axial direction (X) the safety ring (200) is moved to the third axial position (230).

According to one embodiment, a method of unlocking a male part from a female part of a quick connect coupling is disclosed. The method may use a female part of the quick connect coupling where the female part comprises a locking sleeve, a safety ring, and a spring with a spring force acting between the locking sleeve and safety ring. Alternatively the method may use a locking mechanism according to any one of the embodiments disclosed herein. The method comprising the following steps in order: (E) moving the safety ring (200) in a second axial direction (Y) and rotating the safety ring (200); (F) moving the safety ring (200) axially in a first axial direction (X) by the spring force of the spring (300); (G) moving the locking sleeve (100) axially in the first axial direction (X) against the spring force of the spring (300); and removing the male part from the female part.

According to one embodiment, the method may further comprise in step (E), by moving the safety ring (200) in the second axial direction (Y) the safety ring (200) is moved to the second axial position (220); and in step (F), by moving the safety ring (200) axially in the first axial direction (X) the safety ring (200) is moved to the third axial position (230).

According to one embodiment, an axial movement of the safety ring (200) from the third axial position (230) to the second axial position (220) can only be done by an axial movement of the safety ring (200) toward the locking sleeve (100) and against the spring force.

According to one embodiment, a colour is displayed to indicate a position of the safety ring (200) and/or the locking sleeve (100).

According to one embodiment, a rotational movement of the safety ring (200) must overcome a rotational spring force.

At least one of the above embodiments provides a locking mechanism, and method therefore, for a quick connect couplings, with safety feature that is simple, but yet very safe. It is a safety feature that is simple in its construction, yet very reliable. This safety feature does not take much space, and fit new and existing couplings, and is easily adaptable. The safety feature is easy to operate and its operation is intuitive. The locking mechanism and its method is inexpensive to manufacture, is easy to manufacture, and is robust. The safety feature is not only safe, but also appears to the user to be safe.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any claimed or described embodiment may be technically combined with any other claimed or described embodiments.

BRIEF DESCRIPTION OF THE DRAWINGS

The accompanying drawings illustrate presently exemplary embodiments of the disclosure, and together with the general description given above and the detailed description of the embodiments given below, serve to explain, by way of example, the principles of the disclosure.

The following figures correspond to each other: FIGS. 1, 13, and 16; FIGS. 2, 14, and 15; FIGS. 3, 12, and 17; FIGS. 4, 11, and 18; FIGS. 5, 10, and 19; FIGS. 6, 9, and 20; and FIGS. 7, 8, and 21.

DETAILED DESCRIPTION

Figure 1:
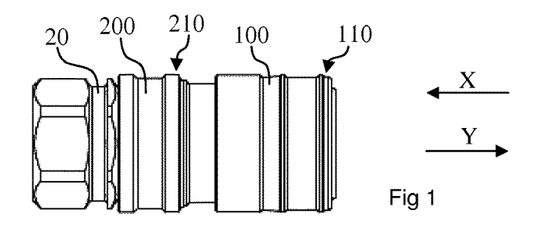
FIGS. 1 to 7 are exemplary diagrammatic illustrations of a locking mechanism and coupling a male part (nipple) to a female part (coupling) according to an exemplary embodiment of the present disclosure.
Figure 2:
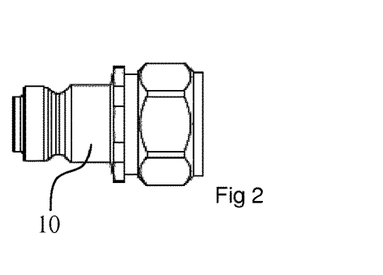
Figure 3:
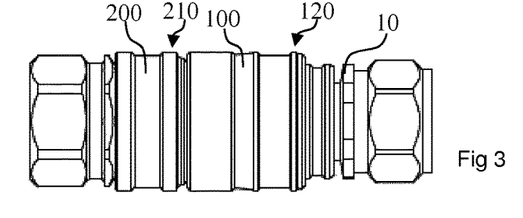
Figure 4:
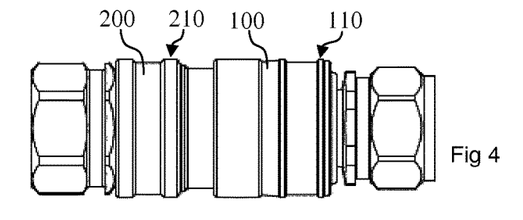
Figure 5:
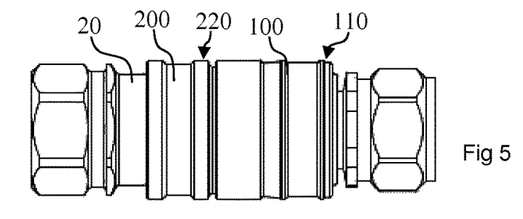
Figure 6:
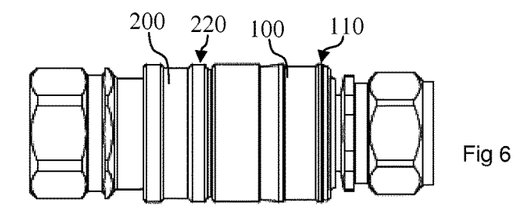
Figure 7:
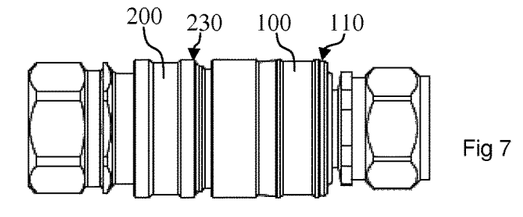

FIGS. 1 to 7 are exemplary diagrammatic illustrations of a locking mechanism and coupling a male part (nipple) to a female part (coupling) according to an exemplary embodiment of the present disclosure. FIGS. 1 to 7 illustrate a quick connect coupling having a locking sleeve (100), and how the male part (10) is connected to the female part (20) using a safety ring (200). FIGS. 15 to 21 are exemplary diagrammatic illustrations corresponding to the FIGS. 1 to 7. FIG. 1 corresponds to FIG. 16. FIG. 2 corresponds to FIG. 15. FIG. 3 corresponds to FIG. 17. FIG. 4 corresponds to FIG. 18. FIG. 5 corresponds to FIG. 19. FIG. 6 corresponds to FIG. 20. FIG. 7 corresponds to FIG. 21.

Figure 16:
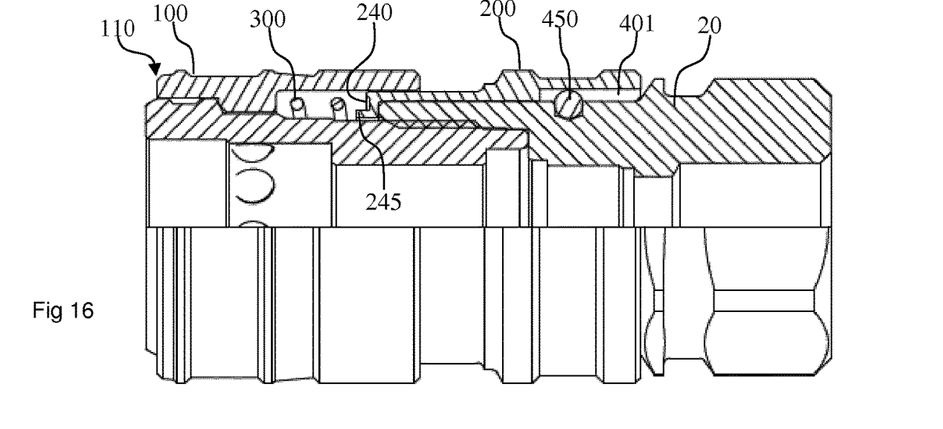
FIGS. 16 to 21 are exemplary diagrammatic illustrations of a locking mechanism according to an exemplary embodiment of the present disclosure.

FIG. 1 and FIG. 16 illustrates a female part (20) of a quick connect coupling with a locking sleeve (100). The locking sleeve (100) may lock, for example, balls into a groove of the male part (10). The locking sleeve (100) is in a locked position (110) in FIG. 1. A safety ring (200) is arranged around the coupling to prevent the locking sleeve (100) from accidentally uncouple the quick connect coupling by keeping the locking sleeve in the locked position (110) and/or preventing the locking sleeve (100) to move axially to an unlocked position (120 in FIGS. 3 and 17). The safety sleeve (200) is in a first axial position (210). This is may be a position as far away from the locking sleeve (100) as possible. The first axial position (210) is for allowing the locking sleeve (100) to be in, and be moved to, the unlocked position (120).

Figure 22:
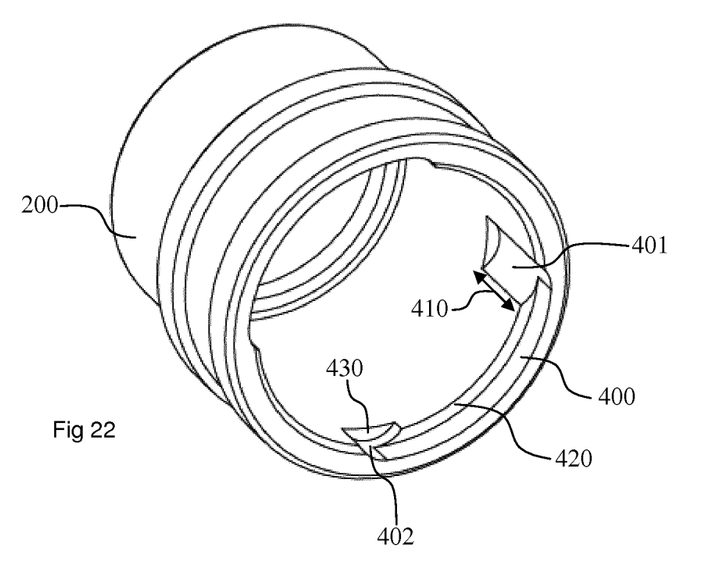
FIG. 22 is an exemplary diagrammatic illustration of a safety ring (200) according to an exemplary embodiment of the present disclosure.

FIG. 16 illustrates an exemplary embodiment of the body (20) of the quick connect coupling. Here half the body (20) is illustrated as seen from the outside, while the other half is shown as a cut through the body (20). A spring (300) is arranged to exert a spring force between the locking sleeve (100) and the safety ring (200). The spring force moves the locking sleeve (100) and safety ring (200) axially apart on the body (20). The spring (300) may contact the locking sleeve (100) and the safety ring (200) directly and force them away from each other. A locking element (450), either on the body (20) as illustrated in FIG. 16, or on the safety ring (200) is arranged to interact, to be guided, within a groove (400). The groove (400) may be in the safety ring (200), or in the body (20), respectively. The interaction between the groove (400) and the locking element (450) guides the movements of the safety ring (200) on the quick connect coupling. The groove (400) is best illustrated in FIG. 22, and the part of the groove (400) illustrated in FIG. 16 is the first groove (401) with a length (410).

FIG. 2 illustrates an exemplary embodiment of the male part (10), also called the nipple. The male part (10) may be inserted and connected to, locked into, the female part (20).

Figure 15:
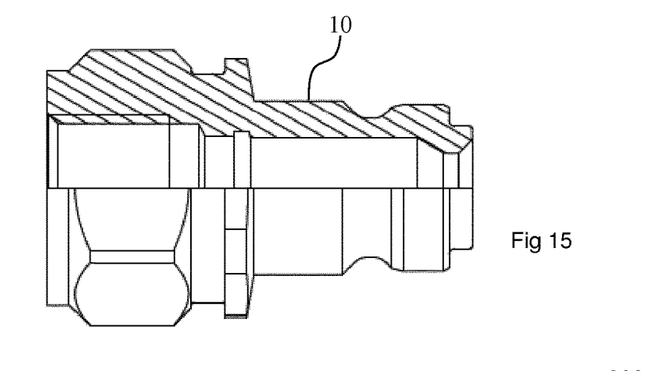
FIG. 15 is a diagrammatic illustration of a male part, a nipple.

FIG. 15 also illustrates an exemplary embodiment of a male part (10). Here half the male part (10) is illustrated as seen from the outside, while the other half is shown as a cut through the male part (10).

FIG. 3 illustrates how the male part (10) has been inserted into the female part (20). The locking sleeve (100) is in the unlocked position (120). In such an unlocked position (120), the locking sleeve (100) may unlock, for example, balls or other elements and allow the balls or elements to move radially away from a groove of the male part (10). In FIG. 3 the safety ring (200) is still in the first axial position (210) allowing the locking sleeve (100) to be moved freely between the locked position (110) and the unlocked position (120).

Figure 17:
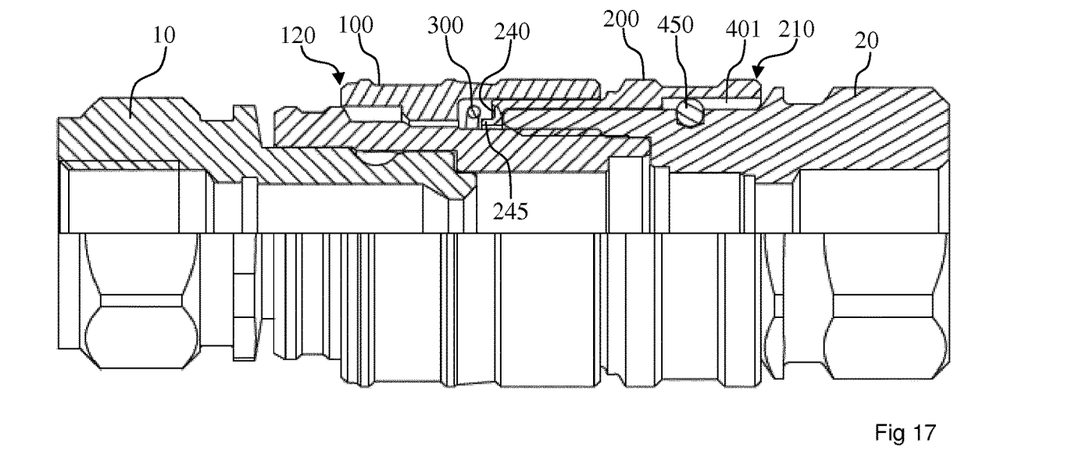

FIG. 17 illustrates an exemplary embodiment similar to FIG. 3. In FIG. 17 the spring (300) is compressed between the locking sleeve (100) and the safety ring (200). The locking sleeve (100) is in the unlocked position (120) allowing the male part (10) to be moved into, or out, from the female part (20). Element, for example balls, may be radially movable out of a groove of the male part (10) to allow the male part (10) to be moved into the female part (20).

FIG. 4 illustrates how the locking sleeve (100) has been moved axially to the locked position (110), compared with the unlocked position (120) in FIG. 3. When the locking sleeve (100) is in the locked position (110) then the male part (10) can not be removed from the female part (20). The safety ring (200) is in the first axial position (210), because the spring (300 in FIG. 16) between the locking sleeve (100) and the safety ring (200) forcing them apart.

Figure 18:
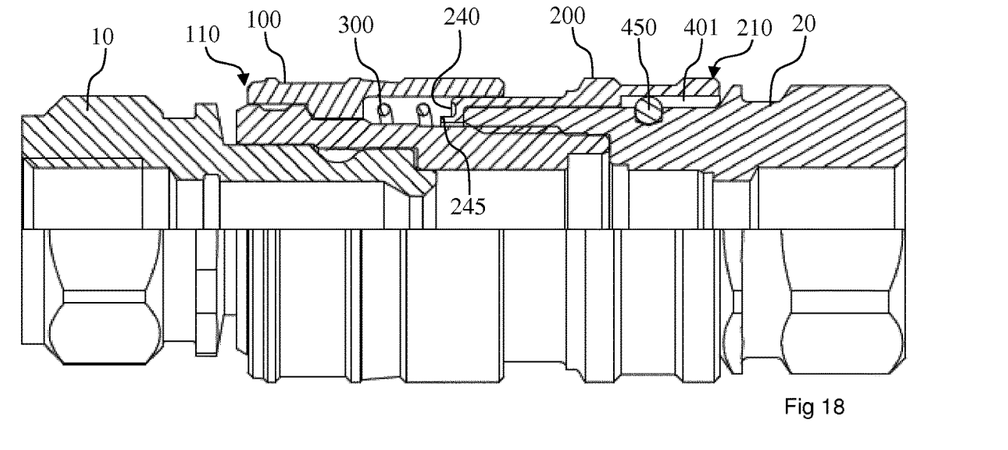

FIG. 18 illustrates the locking sleeve (100) in the locked position (110) and the spring (300) forcing the locking sleeve (100) and the safety ring (200) apart. The spring may contact directly the locking sleeve (100). The spring may contact directly the safety ring (200), for example, at an axial indentation (240) in which the spring may enter. The spring may additionally, or alternatively, be supported by an L-shaped flange (245) of the safety ring (200). The axial indentation (240) and the L-shaped flange (245) may be at the end of the safety ring (200) that is closest to the locking sleeve (100).

In FIG. 5 the safety ring (200) has been pushed, for example by hand force, in the axial direction of the quick connect coupling against the spring force towards the locking sleeve (100). The safety ring (200) may be pushed all the way up against the locking sleeve (100) or only towards the locking sleeve (100). The safety ring (200) is hereby in a second axial position (220). Such an axial movement of the safety ring (200) may be the only possible movement of the safety ring (200) and may subsequently make it possible that the safety ring (200) can be rotated as a next step.

Figure 19:
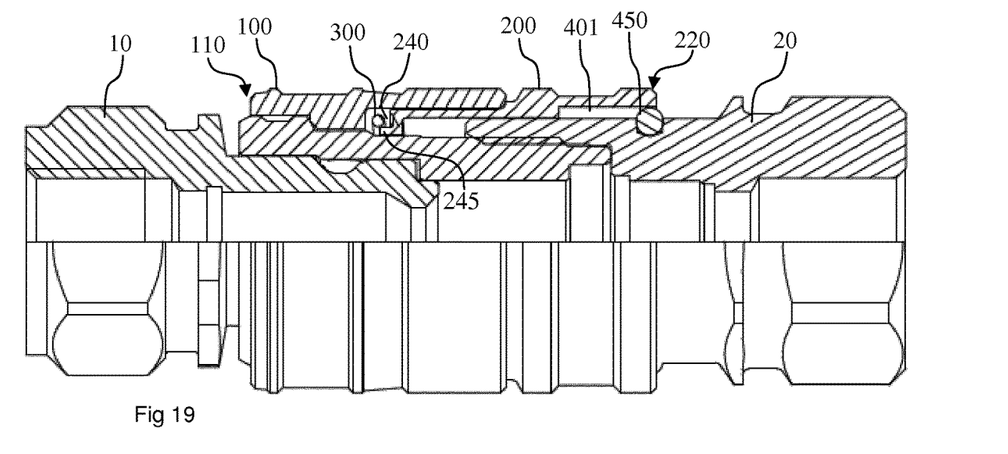

FIG. 19 illustrates an exemplary embodiment where the locking sleeve (100) and the safety ring (200) are pushed towards each other, as illustrated in FIG. 5, and the spring (300) is compressed. The locking element (450) is still in the first groove (401).

In FIG. 6 the safety ring (200) is rotated relatively the quick connect coupling. For example the safety ring can be rotated about 60, 90, or 120 degrees, or more or less. During this rotation the safety ring (200) may be in the second axial position (220). Such a rotation may make it possible that the safety ring (200) can be moved axially away from the locking sleeve (100) as a next step.

Figure 20:
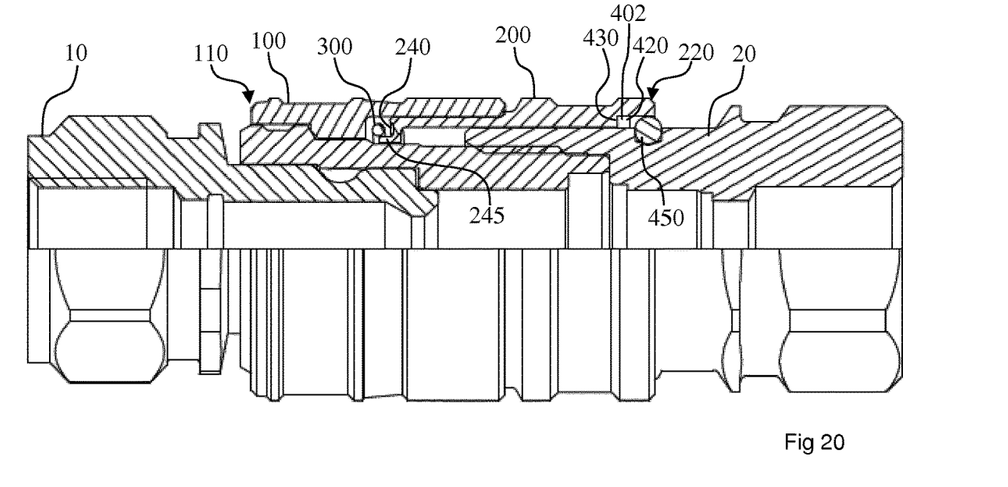

FIG. 20 illustrates an exemplary embodiment where the locking sleeve (100) and the safety ring (200) have been relatively rotated, as illustrated in FIG. 6. The locking element (450) is at a second end point (420) as also illustrated in FIG. 22. The locking element (450) is in the circumferential part of the groove (400) with a second end point (420) and this allows the safety ring (200) to be rotated relatively the locking sleeve, or the body (2) of the quick connect coupling. During the rotation the locking element (450) is guided by the groove (400). As stated above, the groove (400) may be in the body (20) and the locking element (450) may be in the safety ring (200) instead.

In FIG. 7 the safety ring (200) is moved axially away from the locking sleeve (100). Hereby the safety ring (200) is moved to a third axial position (230). The safety ring (200) may be only a few millimetres, for example 2, 3, 4, or 5 millimetres axially away from the locking sleeve (100). The safety ring (200) is fixed in the third axial position (230) because of a track (400) and a locking element (450) and the spring (300) as seen for example in FIG. 21 and explained further on. With the safety ring (200) in the third axial position (230) the locking sleeve (100) can not be moved axially further then against the safety ring (200) and hereby the locking sleeve is kept in a locking position, locking the male part (10) in the female part (20). The only way of disconnecting the male part from the female part is to reverse the method described above and this is described with reference to FIGS. 8 to 14.

Figure 21:
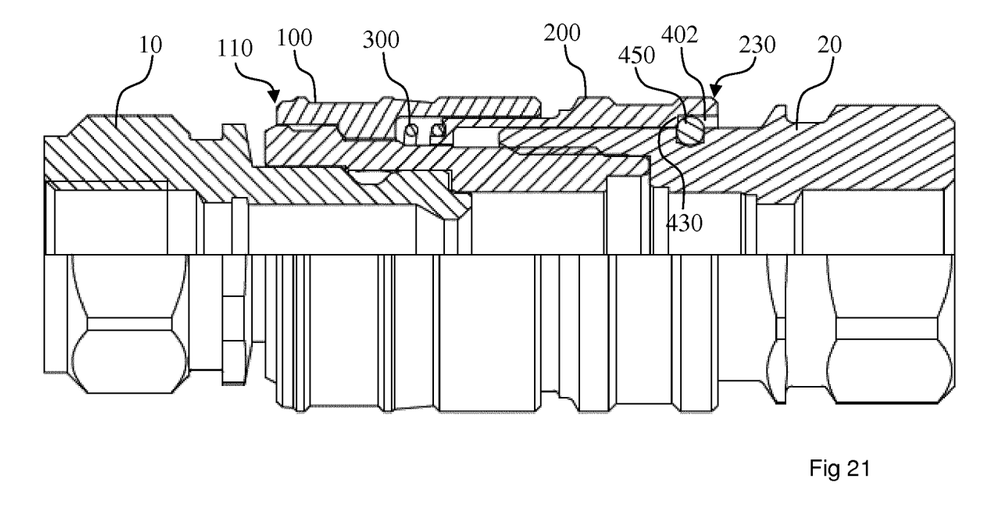

FIG. 21 illustrates an exemplary embodiment where the locking sleeve (100) and the safety ring (200) are in the same positions as illustrated in FIG. 7. The locking sleeve (100) is prevented from moving past the safety ring (200) in the axial direction and consequently the male part (10) is locked safely in the body (20) of the female part (20). In the third axial position (230) a first end point (430) is pressed against the locking element (450) by the spring (300). Since the spring (300) is compressed more in the third axial position (230) than in the first axial position (210), the safety is improved since a larger force is necessary to overcome the spring force in the third axial position (then in the first axial position) and, in addition, a rotational movement of the safety ring (200) is necessary to be able to move the locking sleeve (100) from the locked position (110) to the unlocked position (120).

FIGS. 8 to 14 are exemplary diagrammatic illustrations of a locking mechanism and uncoupling a male part (nipple) from a female part (coupling) according to an exemplary embodiment of the present disclosure. FIGS. 8 to 14 illustrate the quick connect coupling having the locking sleeve (100), and how the male part (10) is disconnected from the female part (20) using the safety ring (200).

Figure 8:
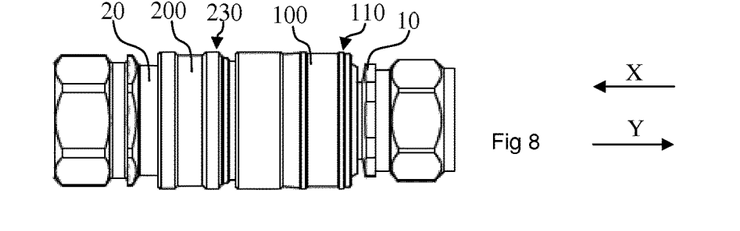
FIGS. 8 to 14 are exemplary diagrammatic illustrations of a locking mechanism and uncoupling a male part (nipple) from a female part (coupling) according to an exemplary embodiment of the present disclosure.

FIG. 8 is an exemplary embodiment of when the locking sleeve (100) is in the locked position (110) and the safety ring (200) is in the third axial position (230) allowing the locking ring to be in the locked position (110). While the locking sleeve (100) may be slightly axially movable in this position, the male part (10) is always locked into the female part (20) in the locked position (110). The safety ring (200) is locked by the locking element (450) being pushed against the first end point (430) of the second groove (402) by the spring force of spring (300). FIG. 8 is similar to FIG. 7 and FIG. 21, because all three illustrate the same position of the locking sleeve (100), the safety ring (200), the male part (10) and the female part (20).

Figure 9:
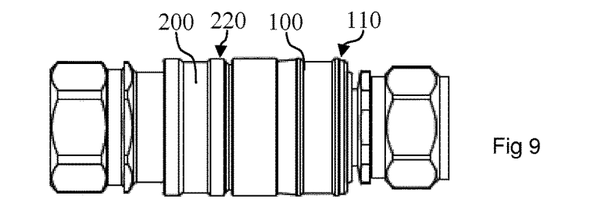

FIG. 9 is an exemplary embodiment of when the safety ring (200) is moved axially towards the locking sleeve (100) and against the spring force of spring (300). Hereby the locking element (450) moves away from the first end point (430) to the second end point (420), which will make it possible to rotate the safety ring (200). The locking sleeve (100) is in the locked position (110). FIG. 9 is similar to FIG. 6 and FIG. 20, because all three illustrate the same position of the locking sleeve (100), the safety ring (200), the male part (10) and the female part (20).

Figure 10:
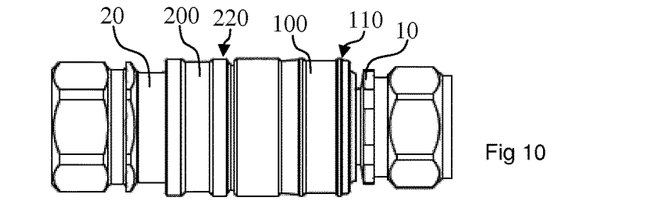

FIG. 10 is an exemplary embodiment of when the safety ring (200) is rotated relatively the quick connect coupling, allowing the locking element (450) to travel in the groove (400) along the second end point (420). The safety ring (200) is in the second axial position (220) allowing the safety ring (200) to rotate. Hereby the locking element (450) is moved from the second groove (402) to the first groove (401). For example the safety ring can be rotated about 60, 90, or 120 degrees, or more or less. The locking sleeve (100) is in the locked position (110). FIG. 10 is similar to FIG. 5 and FIG. 19, because all three illustrate the same position of the locking sleeve (100), the safety ring (200), the male part (10) and the female part (20).

Figure 11:
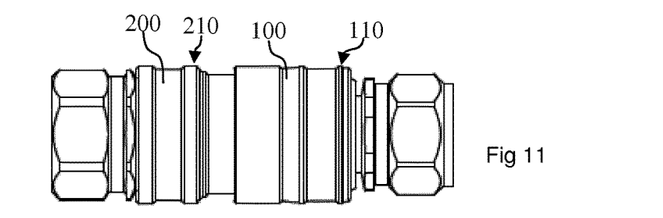

FIG. 11 is an exemplary embodiment of when the safety ring (200) is forced away from then locking sleeve (100) by the spring force of spring (300). Hereby the locking element (450) is guided into the first groove (401). The locking element (450) may slide all the way along the length (410) of the first groove (401). The safety ring (400) may slide all the way away from the locking sleeve (100) until the safety ring (400) engages a part of the body (20) of the quick connect coupling. The locking sleeve (100) is in the locked position (110). FIG. 11 is similar to FIG. 4 and FIG. 18, because all three illustrate the same position of the locking sleeve (100), the safety ring (200), the male part (10) and the female part (20).

Figure 12:
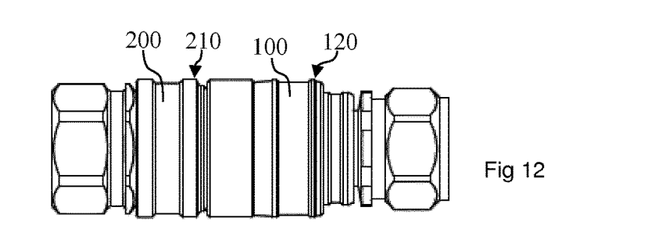

FIG. 12 is an exemplary embodiment of when the locking sleeve (100) is pushed against the spring force of spring (300) from the locked position (110) to the unlocked position (120). In the unlocked position (120) the locking sleeve (100) may allow elements that engage a groove in the male part (10) to move radially outwards and thereby unlocking the male part (10) from the female part (20). FIG. 12 is similar to FIG. 3 and FIG. 17, because all three illustrate the same position of the locking sleeve (100), the safety ring (200), the male part (10) and the female part (20).

Figure 13:
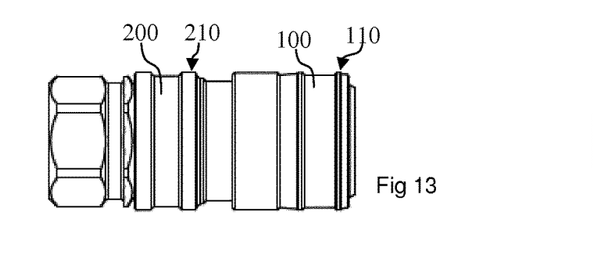
Figure 14:
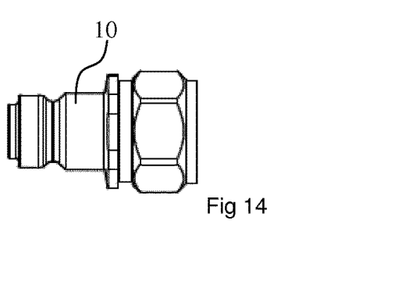

FIG. 13 is an exemplary embodiment of the female part, body (20), of the quick connect coupling without the male part (10) connected. The spring force of the spring (300) forces the locking sleeve (100) into the locked position (110) which is away from the safety ring (200). The safety ring (200) is in the first axial position (210) allowing the locking sleeve to be in the unlocked position (120). FIG. 13 is similar to FIG. 1 and FIG. 16, because all three illustrate the same position of the locking sleeve (100), the safety ring (200), the male part (10) and the female part (20). FIGS. 2, 14, and 15 all three disclose the similar male part (10), the nipple, disconnected from the female part of the quick connect coupling.

Each embodiment, variation, or feature, disclosed in this description may be combined with any other embodiment, variation, or feature disclosed in this description. All the drawings are merely exemplary embodiments, diagrammatic illustrations, used for disclosing the locking mechanism, the method and its technical effect.

According to one embodiment, a locking mechanism for a quick connect coupling having a locking sleeve (100) is disclosed. The locking mechanism is for the female part (20), the coupling, of the quick connect coupling. The locking sleeve (100) is axially displaceable for locking the quick connect coupling in a locked position (110) and for unlocking the quick connect coupling in an unlocked position (120). The locked position (110) may be a position of the locking sleeve (100) away from, remote from, a safety ring (200) and the unlocked position (120) may be a position of the locking sleeve (100) towards to, close to when compared with remote from, the safety ring (200).

The locking mechanism comprises further the safety ring (200). The safety ring (200) is axially displaceable for engaging the locking sleeve (100). The safety ring (200) being partly inside or partly outside the locking sleeve (100). As illustrated for example in FIGS. 16-21 the safety ring (200) is partly inside the locking sleeve (100). However, the locking sleeve (100) may instead be partly inside the locking sleeve (200). The locking sleeve (100) and the safety ring (200) may be arranged as cylinders axially movable on the outside of the female part (20) of the quick connect coupling.

The safety ring is positionable in, at least, three different axial positions. The first axial position (210) allows, arranges, the locking sleeve (100) to be in the unlocked position (120). The second axial position (220) allows for, arranges for, the safety ring (200) to rotate. The third axial position (230) allows, arranges, the locking sleeve (100) to be in the locked position (110).

The locking mechanism comprises the spring (300). The spring acts, directly, between the locking sleeve (100) and the safety ring (200), the spring (300) comprising a spring force forcing the locking sleeve (100) and the safety ring (200) away from each other.

According to one embodiment, the locking mechanism may further comprise a track (400) and a locking element (450), the locking element (450) being relatively movable in the track (400). The track (400) may be a groove and the locking element may be an extension, both in the radial sense of the quick connect coupling. The two interact to guide the possible movements of the safety ring (200) on the body (20) of the quick connect coupling. According to one embodiment, the locking mechanism may further comprise that the track (400) is in the safety ring (200) or in a body (20) of the quick connect coupling, and the locking element (450) is arranged on a body (20) of the quick connect coupling or arranged on the safety ring (200), respectively. In the present exemplary disclosure the track (400) is in the safety ring (200) and the locking element (450) is in the body (20).

According to one embodiment, the locking mechanism may further comprise that the track (400) comprises two grooves (401, 402) in the axial direction connected at each one of their ends with a third groove (400) in the circumferential direction. This may best be taken from FIG. 22. The three grooves may form substantially a U-shaped groove with the two bars of the U having different length, one short and one long. According to one embodiment, the locking mechanism may further comprise that the first groove (401) in the axial direction has a length (410) corresponding to the first axial position (210) for allowing the locking sleeve (100) to be in the unlocked position (120), that the second groove (402) in the axial direction has a first end point (430) corresponding to the third axial position (230), and that the third groove (400) has a second end point (420) corresponding to the second axial position (220) for allowing the safety ring (200) to rotate. As described herein, the locking element (450) travels in, is guided by, the track (400), and this allows the safety ring (200) to take the corresponding different, at least three positions, and thereby preventing the locking sleeve (100) to be accidentally moved from the locked position (110) to the unlocked position (120).

According to one embodiment, the safety ring (200) may further comprise an axial indentation (240) engaging and supporting the spring (300). According to one embodiment, the safety ring (200) may further comprise an L-shaped flange (245) at one end supporting the spring (300). The safety ring (200) may have both of these features or only one of them. This allows the spring (300) to be guided and held in the right position, so that it does not engage, or scratch, against any parts of the quick connect coupling. This results in a very smooth operation of the locking mechanism. This allows the safety ring (200) to be in direct contact with one side of the spring (300) and the locking sleeve (100) to be in direct contact with the other side of the spring (300).

According to one embodiment, one end of the spring (300) may be rotationally fastened to the safety ring (200), for example engaging the axial indentation (240). The other end of the spring (300) may be rotationally fastened to the locking sleeve (100). The locking sleeve (100) may be prevented from rotating in relation to the body (20) of the quick connect coupling. The spring force of the spring (300) does not only provide a spring force that pushes the locking sleeve (100) and the safety ring (200) apart, but also a spring force that provides a rotational spring force between the locking sleeve (100) and the safety ring (200). This provides extra security because not only an axial spring force has to be overcome to unlock the coupling, but also a rotational spring force.

According to one embodiment, the locking mechanism may further comprise two, three, or four sets of the track (400) and the locking element (450), the sets being 180 degrees, 120 degrees, or 90 degrees, respectively, positioned circumferentially, equi-circumferentially, around the quick connect coupling. According to a preferred embodiment the locking mechanism comprises two sets of the track (400) and the locking element (450) positioned circumferentially around the quick connect coupling with the sets being 180 degrees apart from each other. This exemplary embodiment is illustrated in FIG. 22.

According to one embodiment, a method of locking, connecting, a male part to a female part of a quick connect coupling is disclosed. The method uses the female part of the quick connect coupling where the female part comprises a locking sleeve, a safety ring, and a spring with a spring force acting between, forcing apart, the locking sleeve and safety ring. Alternatively, the method mat use any embodiment disclosed herein. The method comprising the following steps in order. (A) Moving the locking sleeve (100) and the safety ring (200) axially in a first axial direction (X) and inserting the male part (10) into the female part (20). This axial direction may be away from the male part (10). (B) Moving the locking sleeve (100) axially in a second axial direction (Y) by the spring force of the spring (300). The first axial direction (X) and the second axial direction (Y) being opposite to each other and the axis relates to the inherent axis of a quick connect coupling being substantially cylindrical in shape. (C) Moving the safety ring (200) in the second axial direction (Y) and rotating the safety ring (200). This movement may be against the spring force of the spring (300). (D) Moving the safety ring (200) axially in the first axial direction (X) by the spring force locking the safety ring (200) against rotation and axial movement in the first axial direction (X). The axial directions (X, Y) have been indicated in FIGS. 1 and 8 and relate to FIGS. 1 to 14. By the movements (A) to (D) the male part (10) may be securely locked, connected, to the female part. Only a movement of the safety ring as described below may unlock the nipple from the quick connect coupling.

According to one embodiment, the locking mechanism is according to any embodiment disclosed herein. Step (A) may further be characterised in that the safety ring (200) is moved to the first axial position (210) by moving the locking sleeve (100) and the safety ring (200) axially in the first axial direction (X). Step (C) may further be characterised in that the safety ring (200) is moved to the second axial position (220) by moving the safety ring (200) axially in the second direction (Y). Step (D) may further be characterised by the safety ring (200) is moved to the third axial position (230) by moving the safety ring (200) in the first axial direction (X). These three axial positions of the safety ring (200) have been explained above.

According to one embodiment, a method of unlocking, disconnecting, a male part (10) from a female part (20) of a quick connect coupling is disclosed. The method uses the female part of the quick connect coupling where the female part comprises a locking sleeve, a safety ring, and a spring with a spring force acting between, forcing apart, the locking sleeve and safety ring. Alternatively, the method mat use any embodiment disclosed herein. The method comprising the following steps in order. (E) Moving the safety ring (200) in a second axial direction (Y) and rotating the safety ring (200). This movement may be towards the male part (10). (F) Moving the safety ring (200) axially in a first axial direction (X) by the spring force of the spring (300). This movement may be away from the male part (10). (G) Moving the locking sleeve (100) axially in the first axial direction (X) against the spring force of the spring (300), and removing the male part (10) from the female part (20). The axial directions (X, Y) have been indicated in FIGS. 1 and 8 and relate to FIGS. 1 to 14, the axial directions (X, Y) are opposite each other and are along the inherent axis of a coupling. By the movements (E) to (G) in sequence the male part (10) may be unlocked, disconnected, from the female part.

According to one embodiment, the locking mechanism is according to any embodiment disclosed herein. Step (E) may be further characterised by the safety ring (200) is moved to the second axial position (220) by moving the safety ring (200) in the second axial direction (Y). Step (F) may be further characterised by the safety ring (200) is moved to the third axial position (230) by moving the safety ring (200) axially in the first axial direction (X). These two axial positions of the safety ring (200) have been explained above.

According to one embodiment, an axial movement of the safety ring (200) from the third axial position (230) to the second axial position (220) can only be done by an axial movement of the safety ring (200) toward the locking sleeve (100) and against the spring force. The spring (300) acts on the safety ring (200) and an axial movement of the safety ring is therefore with or against the spring force of spring (300).

According to one embodiment, a colour is displayed to indicate a position of the safety ring (200) and/or the locking sleeve (100). The colour may be on the body (20) of the coupling, and/or on the locking sleeve (100) or safety ring (200) that slides within the other respective safety ring (200) or locking sleeve (100). This may provide an extra safety feature where the right position of the locking sleeve (100) and/or the safety ring (200) may be optically verified.

According to one embodiment, an additional rotational spring force may be overcome to rotate the safety ring in the second axial position (220). The spring (300) may provide the rotational spring force by being connected to the locking sleeve (100) and the safety ring (200). This rotational spring force may act so that a manual force is required to rotate the safety ring (200) to allow the locking sleeve (100) to reach the unlocked position (120).

It will be apparent to those skilled in the art that various modifications and variations can be made to the embodiments disclosed above. Other embodiments will be apparent to those skilled in the art from consideration of the specification and practice of the disclosed junction box, connector, and methods. It is intended that the specification and examples be considered as exemplary only, with a true scope being indicated by the following claims and their equivalents.

LIST OF ELEMENTS

- 10 nipple, male part
- 20 body of quick connect coupling, coupling, female part
- 100 locking sleeve
- 110 locked position
- 120 unlocked position
- 200 safety ring
- 210 first axial position
- 220 second axial position
- 230 third axial position
- 240 axial indentation
- 245 L-shaped flange
- 300 spring
- 400 track
- 401 first groove
- 402 second groove
- 410 length of first groove (in axial direction)
- 420 second end point (in the third groove, corresponding to the second axial position)
- 430 first end point (in the second groove, in the axial direction, corresponding to the third axial position)
- 450 locking element

The invention claimed is:

1. A locking mechanism for a quick connect coupling having a locking sleeve, the locking sleeve is axially displaceable for locking the quick connect coupling in a locked position and for unlocking the quick connect coupling in an unlocked position, the locking mechanism comprising:
    a safety ring, the safety ring is axially displaceable for engaging the locking sleeve and the safety ring being partly inside or partly outside the locking sleeve, the safety ring being positionable in three different axial positions,
    a first axial position for allowing the locking sleeve to be in the unlocked position,
    a second axial position for allowing the safety ring to rotate,
    a third axial position for allowing the locking sleeve to be in the locked position (110);
    a spring, the spring acting between the locking sleeve and the safety ring, the spring comprising a spring force forcing the locking sleeve and the safety ring away from each other; and
    a track and a locking element, the locking element being relatively movable in the track, wherein the track comprises two grooves in the axial direction connected at each one of their ends with a third groove in the circumferential direction; and
    wherein the first groove in the axial direction has a length corresponding to the first axial position for allowing the locking sleeve to be in the unlocked position, the second groove in the axial direction has a first end point corresponding to the third axial position, and the third groove has a second end point corresponding to the second axial position for allowing the safety ring to rotate.

2. The locking mechanism of claim 1, wherein the track is in the safety ring or in a body of the quick connect coupling, and the locking element is arranged on the body of the quick connect coupling or arranged on the safety ring, respectively.

3. The locking mechanism of claim 1, wherein the safety ring comprises an axial indentation engaging and supporting the spring, and/or wherein the safety ring comprises an L-shaped flange at one end supporting the spring.

4. The locking mechanism of claim 1, wherein the spring is arranged to provide a rotational spring force to the safety ring.

5. The locking mechanism of claim 1, further comprising two, three, or four sets of the track and the locking element, the sets being 180 degrees, 120 degrees, or 90 degrees, respectively, positioned circumferentially around the quick connect coupling.

6. A method of locking a male part to a female part of a quick connect coupling using the locking mechanism of claim 1, the method comprising the following steps in order:
    (A) moving the locking sleeve and the safety ring axially in a first axial direction (X) and inserting the male part into the female part;
    (B) moving the locking sleeve axially in a second axial direction (Y) by the spring force of the spring;
    (C) moving the safety ring in the second axial direction (Y) and rotating the safety ring; and
    (D) moving the safety ring axially in the first axial direction (X) by the spring force locking the safety ring against rotation and axial movement in the first axial direction (X).

7. The method of claim 6, wherein the locking mechanism is used in step (A), by moving the locking sleeve and the safety ring axially in the first axial direction (X) the safety ring is moved to the first axial position;
    in step (C), by moving the safety ring axially in the second direction (Y) the safety ring is moved to the second axial position; and
    in step (D), by moving the safety ring in the first axial direction (X) the safety ring is moved to the third axial position.

8. A method of unlocking a male part from a female part of a quick connect coupling using the locking mechanism of claim 1, the method comprising the following steps in order:
    (E) moving the safety ring in a second axial direction (Y) and rotating the safety ring;
    (F) moving the safety ring axially in a first axial direction (X) by the spring force of the spring;
    (G) moving the locking sleeve axially in the first axial direction (X) against the spring force of the spring; and
    removing the male part from the female part.

9. The method of claim 8, wherein the locking mechanism is used in step (E), by moving the safety ring in the second axial direction (Y) the safety ring is moved to the second axial position; and
    in step (F), by moving the safety ring axially in the first axial direction (X) the safety ring is moved to the third axial position.

10. The method of claim 9, wherein an axial movement of the safety ring from the third axial position to the second axial position can only be done by an axial movement of the safety ring toward the locking sleeve and against the spring force.

11. The method of claim 10, wherein a colour is displayed to indicate a position of the safety ring and/or the locking sleeve.

12. The method of claim 11, wherein a rotational movement of the safety ring must overcome a rotational spring force.

* * * * *